United States Patent Office 3,240,666
Patented Mar. 15, 1966

3,240,666
FUNGICIDAL PROCESS
Constantine Katsaros, Crystal Lake, Ill., and Clare B. Kenaga, Lake Geneva, Wis., assignors to Morton International, Inc., a corporation of Delaware
No Drawing. Filed Jan. 11, 1962, Ser. No. 165,676
13 Claims. (Cl. 167—22)

This invention relates to a process for controlling fungicidal soil pathogens and more particularly to a process for controlling fungi which comprises applying to soils containing fungi and fungal colonies a composition containing 1,3-dichloropropene and an isothiocyanate selected from the group consisting of a lower alkyl isothiocyanate and allyl isothiocyanate.

The isothiocyanates utilized in the process of this invention have been known to have fungicidal properties. 1,3-dichloropropene, however, is not known as a fungicide and exhibits little if any fungicidal activity. It has been found, however, that the composition formed from the combination of the aforesaid compounds displays synergistic activity in that it is more effective as an antifungal agent than the additive effect of the components when used alone. Since many fungi which inhabit soils are responsible for both pre-emergence and post-emergence damping-off of seedlings as well as other deleterious effects, improved methods for their control are desirable.

Accordingly, it is an object of this invention to provide an improved process for controlling fungal soil infestations, which comprises applying to the soil an admixture containing 1,3-dichloropropene and a compound selected from the group consisting of a lower alkyl isothiocyanate and allyl isothiocyanate.

It is another object of this invention to provide a process for controlling soil fungi, such as those of the genera Fusarium, Pythium, Rhizoctonia and Alternaria.

A still further object is the provision of a process for controlling the pre-emergence and post-emergence damping-off of seedlings in nurseries, greenhouses and farms.

Further and additional objects will be apparent from the description and the claims.

In one broad form the present invention comprises a process for controlling pathogenic soil fungi by applying to the infested soil and admixture of 1,3-dichloropropene and an isothiocyanate, such as methyl, ethyl or allyl isothiocyanates, or mixtures thereof. The proportions of the ingredients present in the composition used in the process of this invention may vary over a wide range. Broadly the isothiocyanates and 1,3-dichloropropene are present in the admixture on a relative proportion basis in amounts of from about 10 to 65 percent by weight isothiocyanate and from 35 to 90 percent by weight 1,3-dichloropropene. Preferably the isothiocyanate component is present in amounts of from 15 to 50 percent by weight and the 1,3-dichloropropene in amounts of from about 50 to about 85 percent by weight.

Particular soil fungi infestations, to which the compositions used in the present invention are applied with beneficial effect, are fungi of the genera selected from the group consisting of Fusarium, Pythium, Rhizoctonia and Alternaria.

The following examples will illustrate the effectiveness of the process of this invention when used to control and destroy fungal infestations in soil and the synergism exhibited by the compositions used in this process.

EXAMPLE I

Test procedure: A container with a 0.66 cubic foot capacity was filled with unsterilized muck soil naturally infested with organisms of the genera Pythium and Rhizoctonia.

The various compositions used in control of the fungus infestation were injected in the center of the soil mass and a lid was placed on the container. After 48 hours the lid was removed and the soil transferred to two half-flats. Each half-flat, representing one unit replicate of soil, contained 0.33 cubic foot of soil. The soil was aerated a total of eleven days before planting. Each unit was planted with four rows of 25 seed balls of Detroit Dark Red table beets (maximum germination of 100 seed balls gives approximately 175 seedlings). The planting and watering was carried out uniformly for all flats. The replicate treatments were randomized. After emergence had begun (approximately 4 to 6 days after planting (daily counts of post-emergence damping-off were made. The accumulated damping-off values, plus the final stand of healthy seedlings after two weeks, were tabulated as an estimation of over-all protection against pre-emergence and post-emergence damping-off.

The compositions utilized in this example illustrate the synergism obtained by the herein claimed compositions as contrasted with the use of either methyl isothiocyanate or 1,3-dichloropropene alone. The compositions used in the soil treatment were as follows.

Composition A:
    20% methyl isothiocyanate, 80% xylene (xylene used as a carrier)
Composition B:
    Technical 1,3-dichloropropene (Technical 1,3-dichloropropene contains about 50% 1,3-dichloropropene and about 50% dichloropropane and related chlorinated hydrocarbons)
Composition C:
    20% methyl isothiocyanate and 80% technical 1,3-dichloropropene (see "Composition B")

The increase in the total emergence of seedlings using the synergistic composition (C) over the total theoretical emergence of either of the components thereof (A and B) used alone is a measure of synergism obtained for pre-emergence damping-off protection. Likewise the increase in the final stands of seedlings in soil treated with composition C over the final stand of seedlings in soil treated with either composition A or composition B alone is a measure of synergism in post-emergence damping-off protection.

The results obtained using the above compositions are set forth in the following table:

Procedure: One end of a glass tube is stoppered with the polyethylene stoppers and approximately 57 grams of Table 1

| Composition | Composition components, gm./cu. yd. | | Total emergence, number of seedlings [3] | Theoretical emergence | Synergism | Final stand, number of seedlings [3] | Theoretical stand | Synergism |
|---|---|---|---|---|---|---|---|---|
| | Methyl isothiocyanate.[1] | 1,3-dichloropropene,[1][2] | | | | | | |
| IA | [4] 72 | 0 | 38 | | | 74 | | |
| IB | 0 | 290 | 26 | | | 61 | | |
| IC | 72 | 288 | 109 | 64 | 45 | 163 | 135 | 28 |
| IIA | [4] 54 | 0 | 34 | | | 57 | | |
| IIB | 0 | 215 | 17 | | | 52 | | |
| IIC | 54 | 216 | 92 | 51 | 41 | 143 | 109 | 34 |
| Untreated control | | | 74 | | | 20 | | |

[1] The rate of application for the components in compositions A and B and the combination of components in composition C are shown in grams per cubic yard of soil.
[2] Technical (see Composition B, supra).
[3] Total emergence and final stand are average increases over the untreated control in numbers of seedlings from four replicates.
[4] Xylene was used as a carrier.

In the foregoing table it may be seen that composition C shows unexpectedly superior results with respect to both pre-emergence and post-emergence damping-off over the use of composition A or composition B alone. Thus in pre-emergence damping-off the results obtained by use of composition C are from 70 to 80 percent greater than would be expected for the combination of compositions A and B. Similarly in post-emergence damping-off the results obtained by composition C are from about 20 to about 30 percent greater than would be expected for the combination of compositions A and B.

The following examples will illustrate the synergistic effect obtained by the use of the herein claimed compositions against certain pathogenic soil organisms.

EXAMPLE II

*Methyl isothiocyanate and dichloropropene in the control of Rhizoctonia solani*

Test procedure:

Materials and equipment—
Open end glass tubes [1], 5" long I.D. 1.039"
20–40 mesh sea sand [1]
Black loam soil [1] with moisture equivalent between 15–20% passed through No. 12 sieve (U.S. Standard Sieve series)
Pipettes [1] graduated in 1/100 ml.
Culture of *Rhizoctonia solani* growing on potato dextrose agar plates
Cork borer 9 millimeters I.D.
Petri plates containing sterile potato dextrose agar
Polyethylene stoppers (equivalent to No. 14 size corks)
N,N-dimethylformamide.

[1] All of the above mentioned are sterilized in the autoclave.

soil are placed in a tube and the soil is gently and evenly compacted by swinging the tube by hand in an arc from one side up over the head and back down to the side. The soil is uniformly compacted to a column 3⅜ to 3½" long. A ¼" layer of the sterile dry sea sand is then added to the tube.

By means of a sterile cork borer a disk of mycelium of *Rhizoctonia solani* is cut from the culture plate and placed mycelium down on the surface of the sea sand. Five drops of sterile water are added to the sea sand to prevent the mycelial disk from drying. A polyethylene stopper is gently pushed into the tube just to the point of contact with the surface of the sea sand and mycelial disk.

The glass tube is then inverted and the first stopper removed. The test chemicals are dissolved in N,N-dimethylformamide at 5% active. The solubilized candidate compound is then pipetted into the tube in the middle of the soil surface.

Immediately after addition of the test compound, the open end of the tube is closed with the stopper which is pushed gently into the tube just to the point of contact of the surface of the soil.

All treatments are replicated five times and an untreated check is included in each run.

After 48 hours the mycelial disks are transferred separately to sterile potato dextrose agar petri plates and allowed to incubate for five days. Data is recorded as to growth or no growth of *Rhizoctonia solani*.

Both the tubes and the subsequent potato dextrose agar cultures are incubated at room temperature.

Results:

Table 2

[Results of two separate tests each replicated five times]

| | Composition components, μg./tube | | Growth of *Rhizoctonia solani* | | | | | | |
|---|---|---|---|---|---|---|---|---|---|
| | Methyl isothiocyanate | 1,3-dichloropropene [1] | Replications [2] | | | | | Total number showing growth | Treatments showing synergism |
| | | | 1 | 2 | 3 | 4 | 5 | | |
| 1 [3] | | | X | X | X | X | X | 5 | |
| 2 | 150 | | X | X | X | X | X | 5 | |
| 3 | 200 | | X | X | X | X | X | 5 | |
| 4 | | 600 | X | X | X | X | X | 5 | |
| 5 | | 800 | X | X | X | X | X | 5 | |
| 6 | | 1,000 | X | X | X | X | X | 5 | |
| 7 | | 1,500 | X | X | X | X | X | 5 | |
| 8 | 150 | 600 | O | O | O | O | O | 0 | X |
| 9 | 200 | 800 | O | O | O | O | O | 0 | X |

[1] Same as Composition B, in Example I.
[2] X—indicates growth of *R. solani* after transfer from tubes. O—indicates no growth of *R. solani* after transfer from tubes.
[3] Control.

NOTE.—All treatment materials were diluted in N,N-dimethylformamide prior to placement in tubes.

EXAMPLE III

*Methyl isothiocyanate and dichloropropene in the control of Alternaria solani*

Test procedure: The procedure in this example was identical with Example II except that *Alternaria solani* was the test organism.

Results:

*Table 3*

[Results of one test using five replications]

| | Composition components, μg./tube | | Growth of *Alternaria solani* | | | | | | |
|---|---|---|---|---|---|---|---|---|---|
| | Methyl isothio-cyanate | 1,3-di-chloro-propene [1] | Replications [2] | | | | | Total number showing growth | Treatments showing synergism |
| | | | 1 | 2 | 3 | 4 | 5 | | |
| 1 [1][3] | | | X | X | X | X | X | 5 | |
| 2 | 400 | | X | X | X | X | X | 5 | |
| 3 | 300 | | X | X | X | X | X | 5 | |
| 4 | 200 | | X | X | X | X | X | 5 | |
| 5 | 150 | | X | X | X | X | X | 5 | |
| 6 | | 2,000 | X | X | X | X | X | 5 | |
| 7 | | 1,500 | X | X | X | X | X | 5 | |
| 8 | | 1,000 | X | X | X | X | X | 5 | |
| 9 | | 800 | X | X | X | X | X | 5 | |
| 10 | | 600 | X | X | X | X | X | 5 | |
| 11 | 200 | 800 | O | O | O | O | O | 0 | X |
| 12 | 150 | 600 | X | X | X | X | X | 5 | |

[1] Same as Composition B in Example I.
[2] X—indicates growth of *A. solani* after transfer from tubes. O—indicates no growth of *A. solani* after transfer from tubes.
[3] Control.

EXAMPLE IV

*Allyl isothiocyanate and dichloropropene in the control of Rhizoctonia solani*

Test procedure. The procedure used in this example was identical with that of Example II, with the exception that a 72 hour exposure time was employed before transferring the mycelial disks to potato dextrose agar petri plates.

Results:

EXAMPLE V

Mason jars were filled with 300 grams (oven dry weight) of loam soil at a moisture level of 56 percent of field capacity. The loam soil was infested with the organism *Fusarium roseum* f. *cerealis*. The test materials were introduced into the jars at the rates indicated in the Table 5 following. The jars were sealed for 72 hours and then aerated for 10 days. Soil microbiological sampling tubes (12 holes/tube) were then exposed to the soil for 72 hours and isolations made. Each experiment was replicated five times. The results are as indicated in Table 5.

*Table 4*

[Results of one test using four replications]

| | Composition components, μg/tube | | Growth of *Rhizoctonia solani* | | | | | |
|---|---|---|---|---|---|---|---|---|
| | Allyl isothio-cyanate | 1,3-dichloro-propene [1] | Replications [2] | | | | Total number showing growth | Treatments showing synergism |
| | | | 1 | 2 | 3 | 4 | | |
| 1 [1][3] | | | X | X | X | X | 4 | |
| 2 | 1,750 | | X | X | X | X | 4 | |
| 3 | 2,250 | | X | X | X | X | 4 | |
| 4 | 2,750 | | X | X | X | X | 4 | |
| 5 | | 5,250 | X | X | X | X | 4 | |
| 6 | | 6,750 | X | X | X | X | 4 | |
| 7 | | 8,250 | X | X | X | X | 4 | |
| 8 | 1,750 | 5,250 | O | X | X | X | 3 | X |
| 9 | 2,250 | 6,750 | O | O | X | X | 2 | X |
| 10 | 2,750 | 8,250 | O | O | O | X | 1 | X |

[1] Same as Composition B in Example 1.
[2] X—indicates growth of *R. solani* after transfer from tubes. O—indicates no growth of *R. solani* after transfer from tubes.
[3] Control.

Table 5

[Control of *Fusarium roseum*]

| Concentration,[1] p.p.m. | | Percent kill[2] | | |
|---|---|---|---|---|
| Methyl isothiocyanate | 1,3-dichloropropene[3] | Actual | Theoretical | Synergism |
| 2 | | 0 | | |
| | 8 | 12 | | |
| 2 | 8 | 75 | 12 | 63 |
| Control | | 0 | | |

[1] Concentration in p.p.m. (parts per million) based on soil.
[2] Based on a control of five replicate tubes *F. roseum* and other fungi.
[3] The dichloropropene utilized contained about 90% 1,3-dichloropropene and about 10% 1,3-dichloropropane and related $C_3$ chlorinated hydrocarbons.

While the foregoing compositions may be applied to soils in their undiluted form, where desirable they may also be applied in combination with inert, inactive diluents or carriers. Such diluents and carriers aid in the distribution of the active synergistic composition. Exemplary of solvents which may be used as diluents or carriers in conjunction with the present synergistic compositions are deodorized kerosene, ketones, esters, alcohols, chlorinated hydrocarbons, various low-boiling petroleum fractions, dimethylformamide, and the like.

The amount of material applied in carrying out the process of this invention will vary according to the type of infestation and the character of the particular area to be treated. Application of the composition at rates ranging from about 20 to about 75 gallons per acre is satisfactory. The lower alkyl isothiocyanates, such as methyl isothiocyanate, combinations with 1,3-dichloropropene, are preferably applied at rates of from about 20 to about 60 gallons per acre, and in the most preferred aspects from about 25 to 50 gallons per acre. The allyl isthiocyanate is preferably applied at somewhat higher levels, such as about 30 to 100 gallons per acre and in the most preferred aspects from 40 to 75 gallons per acre. As may be understood, the effectiveness of a particular dosage will vary somewhat with the mode or technique of application and the type of organism infesting the soil. The state of the fungi is also a factor in control, the spore being the more resistant than the actively proliferated cells.

The dichloropropene utilized in the foregoing is, as previously indicated, of a "technical" grade. Thus in Examples 1–4 the "dichloropropene" contained about 50 percent 1,3-dichloropropene-1 and 50 percent 1,2-dichloropropane and related compounds. The material is sold under the tradename "D–D." In Example V the "dichloropropene" contained about 90 percent 1,3-dichloropropene-1, and about 10 percent dichloropropane and related compounds, and is sold under the tradename "Telone".

In the process of the present invention the relative proportions of isothiocyanate and dichloropropene in the admixture applied refer to the active component 1,3-dichloropropene-1. Thus in Example I composition C contains 20% (by weight) of methylisothiocyanate and 80% technical dichloropropene (the latter sold under the tradename D–D). Since the technical dichloropropene contains only about 50% of the active 1,3-dichloropropene-1, the relative proportions of the ingredients in that admixture are 33.3% methylisothiocyanate and 66.6% 1,3-dichloropropene-1, the balance being related $C_3$ chlorocarbon diluent.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for controlling pathogenic soil fungi which comprises applying to the soil habitat of said fungi an admixture containing, on a relative proportion basis, from about 10 to 65 percent by weight of allyl isothiocyanate and from about 90 to 35 percent by weight of 1,3-dichloropropene.

2. A process for controlling fungi comprising applying a composition containing an admixture containing, on a relative proportion basis, from about 10 to 65 percent by weight of an isothiocyanate selected from the group consisting of methyl isothiocyanate and allyl isothiocyanate and from about 90 to 35 percent by weight of 1,3-dichloropropene to the pathogenic fungi.

3. A process according to claim 2 wherein the isothiocyanate is methyl isothiocyanate.

4. A process according to claim 2 wherein the isothiocyanate is allyl isothiocyanate.

5. A process according to claim 2 wherein the admixture is applied in conjunction with an inert carrier.

6. A process for controlling pathogenic soil fungi which comprises applying to the said pathogenic fungi an admixture containing on a relative proportion basis from about 35 to about 90 percent by weight of 1,3-dichloropropene and from about 10 to 65 percent by weight of an isothiocyanate selected from the group consisting of methyl isothiocyanate and allyl isothiocyanate.

7. A process for controlling pathogenic soil fungi which comprises applying to the said pathogenic fungi an admixture containing, on a relative proportion basis, from about 10 to 65 percent by weight of methyl isothiocyanate and from about 90 to 50 percent by weight of 1,3-dichloropropene.

8. A process according to claim 2 wherein the admixture is applied to the fungi in a fungicidally effective amount.

9. A process for controlling the damping-off of seedlings which comprises applying to pathogenic soil fungi in a prepared seed bed a composition containing an admixture containing on a relative proportion basis from about 35 to 90 percent by weight of 1,3-dichloropropene and from about 10 to 65 percent by weight of allyl isothiocyanate.

10. The process of claim 2 wherein the fungi are of the genera Fusarium.

11. The process of claim 2 wherein the fungi are of the genera Pythium.

12. The process of claim 2 wherein the fungi are of the genera Alternaria.

13. The process of claim 2 wherein the fung are of the genera Rhizoctonia.

References Cited by the Examiner

UNITED STATES PATENTS

| | | | |
|---|---|---|---|
| 1,993,040 | 3/1935 | Salzberg et al. | 167—22 |
| 2,502,244 | 3/1950 | Carter | 167—22 |
| 2,785,190 | 3/1957 | Klopping | 167—22 |
| 3,005,752 | 10/1961 | McBeth et al. | 167—22 |

JULIAN S. LEVITT, *Primary Examiner.*

MORRIS O. WOLK, IRVING MARCUS, LEWIS GOTTS, *Examiners.*